United States Patent [19]
Muscat

[11] Patent Number: 6,039,504
[45] Date of Patent: Mar. 21, 2000

[54] PROCESS AND APPARATUS FOR THE TREATMENT OF WASTE

[76] Inventor: Armond Muscat, P.O. Box 251, Algonquin, Ill. 60102

[21] Appl. No.: 09/157,653

[22] Filed: Sep. 21, 1998

[51] Int. Cl.[7] .................................................. B09B 1/00
[52] U.S. Cl. ........................................... 405/129; 210/901
[58] Field of Search .................................. 405/128, 129; 210/901; 241/DIG. 38; 588/900

[56] References Cited

U.S. PATENT DOCUMENTS

| | | | |
|---|---|---|---|
| 3,583,164 | 6/1971 | Sherrill | 405/129 |
| 4,194,855 | 3/1980 | Egger | 405/128 |
| 4,323,367 | 4/1982 | Ghosh | 48/197 A |
| 4,834,300 | 5/1989 | Wojciechowski et al. | 241/24 |
| 4,842,774 | 6/1989 | Golden | 588/16 |
| 5,024,770 | 6/1991 | Boyd et al. | 210/747 |
| 5,236,282 | 8/1993 | Teasel et al. | 405/129 |
| 5,238,580 | 8/1993 | Singhvi | 210/718 |
| 5,242,246 | 9/1993 | Manchak et al. | 405/128 |
| 5,288,170 | 2/1994 | Cummings | 405/129 |
| 5,302,331 | 4/1994 | Jenkins | 264/115 |
| 5,336,842 | 8/1994 | Massholder et al. | 588/227 |
| 5,415,496 | 5/1995 | DenBesten | 405/129 |
| 5,544,976 | 8/1996 | Marchbanks | 405/129 |
| 5,550,314 | 8/1996 | Laughlin et al. | 588/256 |
| 5,580,521 | 12/1996 | Gagne | 422/28 |
| 5,582,573 | 12/1996 | Weszely | 588/257 |
| 5,588,947 | 12/1996 | Studer et al. | 588/252 |
| 5,599,138 | 2/1997 | Kozak et al. | 405/129 |
| 5,662,281 | 9/1997 | Wollert et al. | 241/100 |
| 5,857,807 | 1/1999 | Longo | 405/129 |
| 5,885,026 | 3/1999 | Hwang | 405/129 |
| 5,906,793 | 5/1999 | Vezzani | 422/1 |

Primary Examiner—Eileen Dunn Lillis
Assistant Examiner—Chong S. Cho
Attorney, Agent, or Firm—Douglas B. White

[57] ABSTRACT

A waste processing system transports waste by rail to a processing location near a landfill site where it is pulverized and mixed to form a slurry. This slurry is delivered to the landfill with an auger device. The landfill is first prepared by placing a layer of compacted coal at the bottom of a clay lined pit, covering that layer with a layer of granular coal, and then providing a layer of lye over the coal. The waste slurry is then distributed over these processing layers. A conduit is used to return leachate from the area between the coal layers to the mixing stage; and gas emanating from the process is recovered.

14 Claims, 3 Drawing Sheets

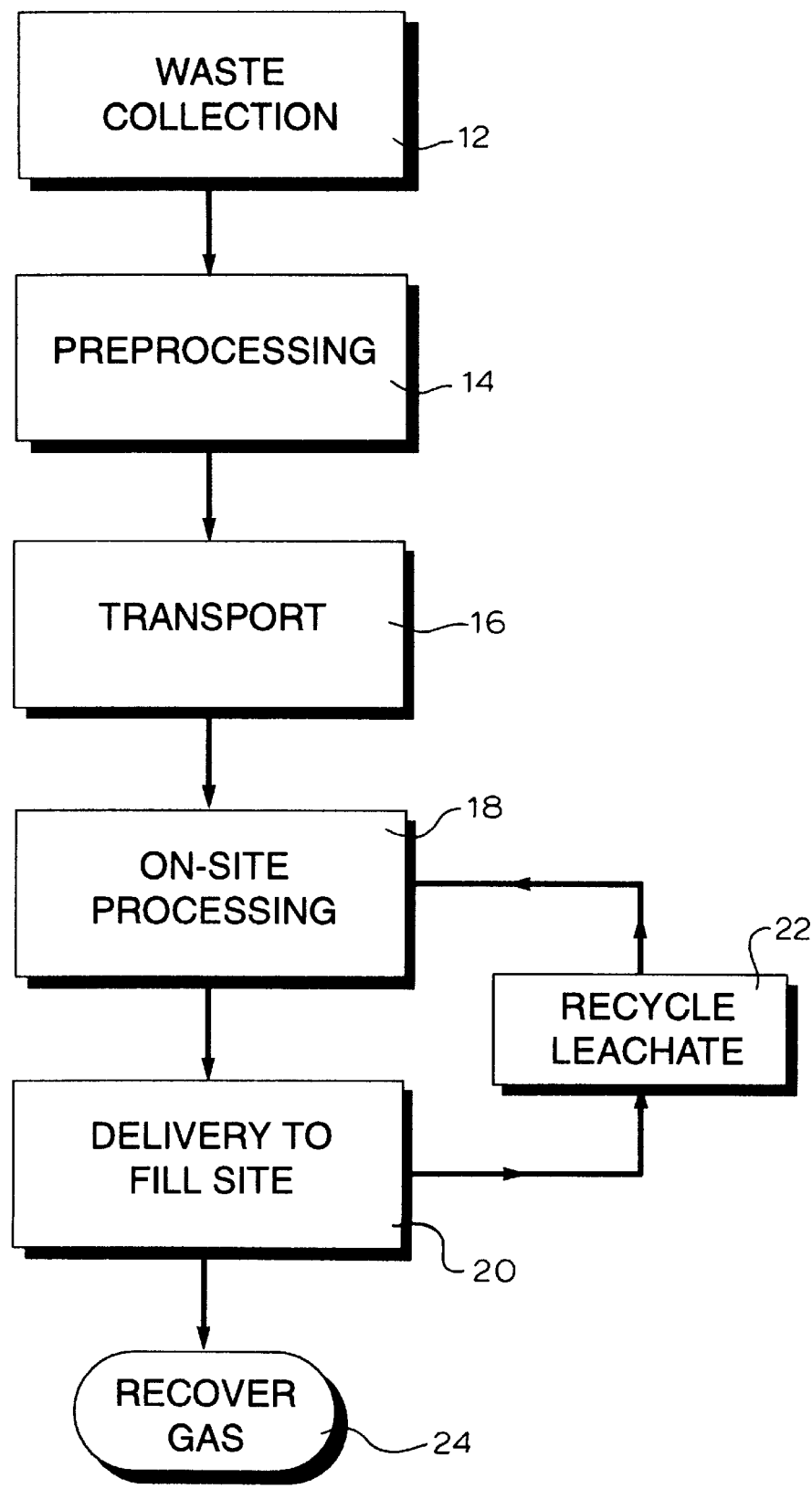

PROCESS AND APPARATUS FOR THE TREATMENT OF WASTE

BACKGROUND OF THE INVENTION

1. Field of the Invention

The present invention relates generally to methods for the treatment of garbage and waste management. More particularly this invention relates to a system for the efficient and ecological treatment of waste by use of existing available strip mines as landfill sites. In this system, waste is first pre-processed and then transported to a second processing location near a landfill site. At this second processing site the waste is pulverized, mixed with water and processing chemicals to form a slurry, and then delivered to the landfill with an auger device. This system also includes a landfill construction where the landfill (preferably an abandoned strip coal mine) is first prepared by placing a layer of clay around the pit, covering the clay with coal, and finally a layer of lye over the coal.

2. Description of the Prior Art

Previous systems for waste management have generally included simply the dumping and compacting of unprocessed waste and garbage into landfill sites. And these landfill sites are usually clean sand or gravel pits. As a result, the leachate from the landfill frequently contaminates the water table surrounding the landfill, and there is limited recovery of by-products from the landfill process. None of the prior waste management systems have addressed the economics of transportation to the landfill sites nor completely resolved the issue of site contamination.

It is accordingly the objective of the present invention to economically use the previously existing natural landfill sites, namely abandoned strip coal mines, and the underused rail transportation to these sites. It is a further objective to use a novel hopper/grinder apparatus to process the waste for compaction and for slurry production with chemical processing additives, and to use an efficient auger device to move the waste to or from the rail line and to deposit the waste slurry into the landfill. Finally, it is an objective to control the leachate and to recover the emanating gas for industrial use.

SUMMARY OF THE INVENTION

The above-mentioned objectives are accomplished with the present waste management system. This system includes the pre-processing of collected waste through a mixer/grinder, the transport of that waste via a rail line to a second processing location near a landfill site, the grinding and mixing of the waste with water at the terminal rail site to form a slurry, and the auger transport of the slurry to the landfill with an auger device.

The landfill is preferably an abandoned strip mine which has been prepared for use as a landfill by placing a layer of clay or liner around the pit, placing a layer of compacted coal at the bottom over the clay, covering that layer with a layer of granular coal, and then providing a layer of lye. The slurry is then distributed over these processing layers. A conduit and pump is used to recover leachate from the area between the coal layers, and gas emanating from the decomposition process is recovered off of the top of the slurry.

BRIEF DESCRIPTION OF THE DRAWINGS

FIG. 3 is a flow-chart diagram showing the waste processing system of the present invention.

Figure 1:
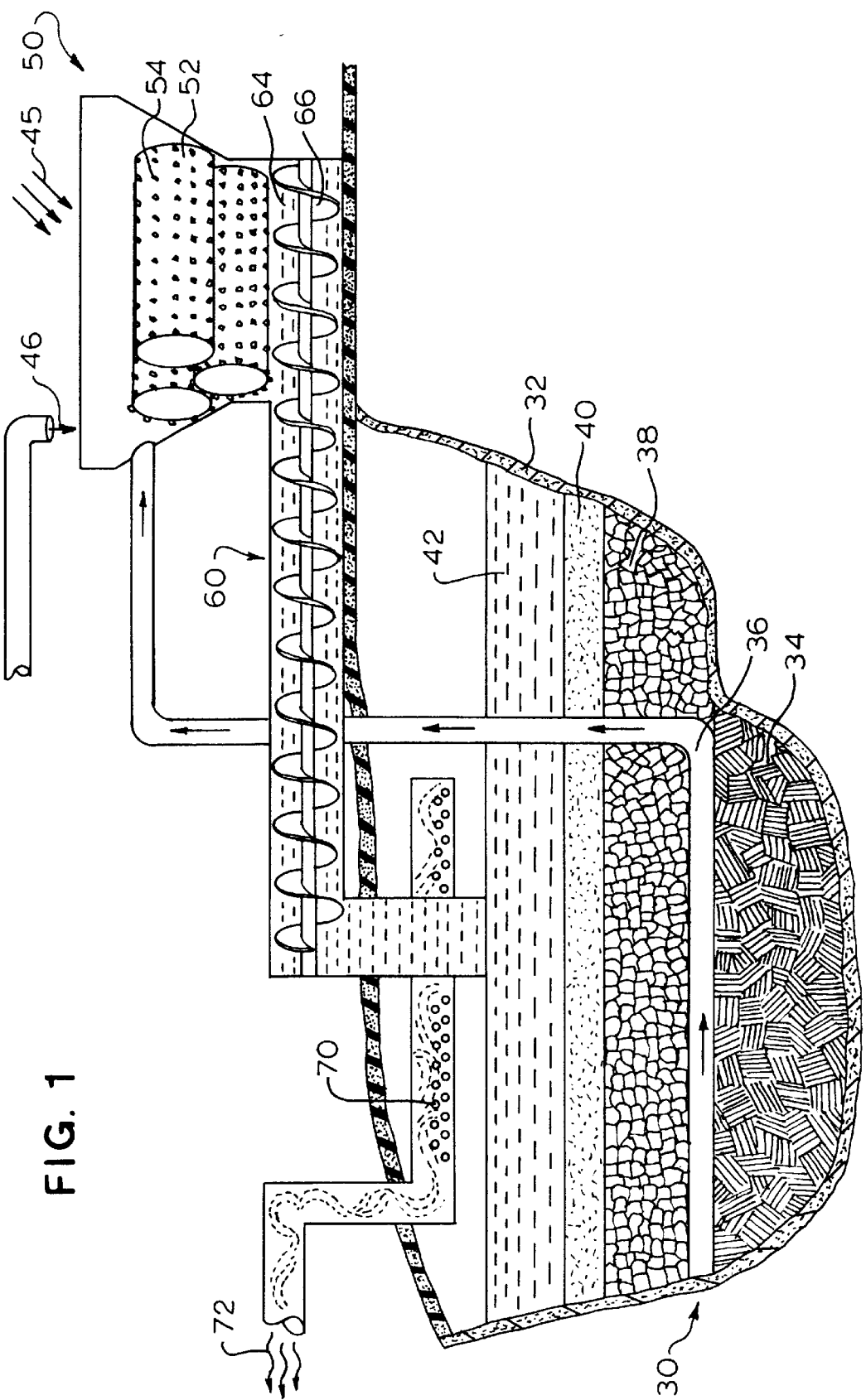
FIG. 1 is a perspective cutaway view of a landfill waste processing site in accordance with the present invention.
Figure 2:
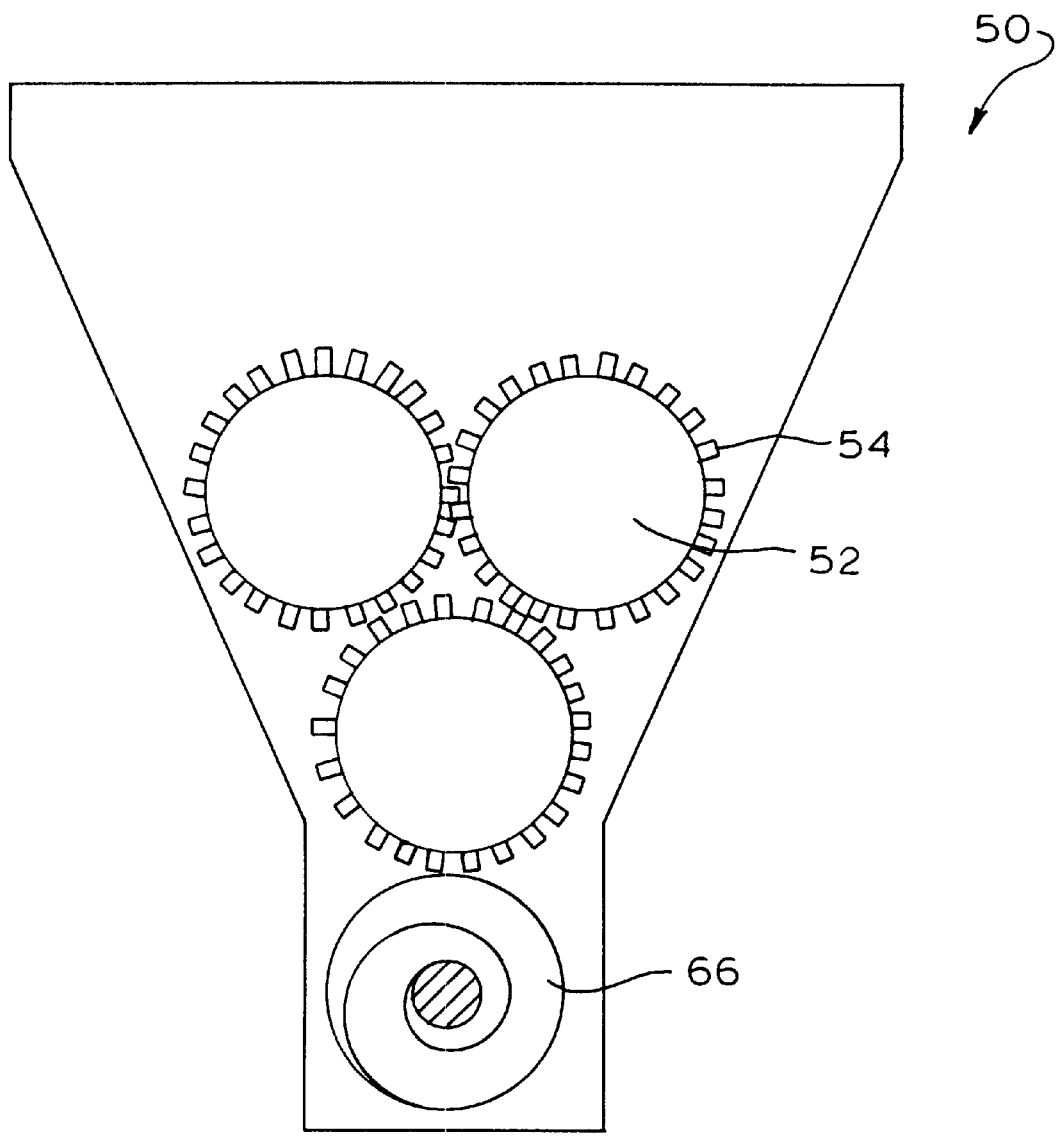
FIG. 2 is a cross sectional view of the hopper/grinder used with the waste processing system of FIG. 1.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Turning first to FIG. 3 there is shown a diagrammatic depiction of the waste treatment process of the present invention. Particularly, the processing of waste begins with customary waste collection 12. This collected waste is taken to a pre-processing site 14 at a transportation access point, such as a rail line. (Pre-processing is an optional economical step and can be either a compacting, pulverizing or shredding in the hopper/grinder described below.) In the preferred embodiment, the transportation 16 comprises rail transport with access to exhausted and abandoned coal strip mines, which mines can be converted to landfills as hereinafter described.

Once on-site, the waste is again processed 18 in a hopper/grinder with the addition of water and chemical processing additives, such as lye or acid, to form a slurry. This slurry is then delivered 20 to a landfill site for the treatment and processing of waste by means of an auger. At the landfill site the leachate from the waste is recovered before it can leak from the landfill and is returned 22 to the hopper/grinder for further processing. Finally, useable gas generated in the landfill is recovered 24 and put to valuable industrial use.

Turning now to FIG. 1, the waste receipt and processing landfill site 30 comprises any pit or depression, but preferably it is an abandoned strip coal mine having a readily available quantity of inexpensive coal. At the bottom of the landfill a clay base 32 or clay liner is provided, if not already naturally existent, to minimize leakage; and on this base, a layer of compacted coal 34 is provided. Any leachate reaching this level (the boundary of the compacted coal) is sucked out and returned to the surface for removal or re-processing via leachate pumping means 36, comprising pumps and conduits well known to the art.

A layer of granular coal 38 is provided above the leachate collection to clean any leaching fluid, and a layer of lye 40 is provided above this granular coal layer to speed decomposition. The slurry waste 42 is finally deposited over these processing layers for passive processing within this landfill system.

Delivery of the slurry to the landfill is accomplished first by processing the received waste 45 in a hopper/grinder 50 and adding a processing fluid 46, such as water, into the hopper/grinder. Particularly, the hopper/grinder is fitted with a plurality of driven rotating grinding cylinders 52 having protruding teeth 54 thereon. An engine and drive mechanism, well known to the art, causes rotation of the cylinders, which crush and tear at the waste to reduce it to fine homogenous particulate matter.

With the addition of a fluid, the slurry created thereby may be pumped, or preferably augered to the landfill. To accomplish this, the hopper/grinder is positioned above a conduit enclosed auger 60 so as to drop the processed waste 64 directly into the rotating transporting vanes 66 of the auger. Finally, a perforated collection pipe 70 is positioned above the slurry in the landfill for collecting emanating gas 72 for industrial use.

From the foregoing description, it will be apparent that modifications can be made to the apparatus and method for using same without departing from the teachings of the present invention. Accordingly, the scope of the invention is only to be limited as necessitated by the accompanying claims.

What is claimed is:

1. A waste treatment process for the treatment of waste comprising the steps of:

first preparing a landfill by first placing a layer of compacted coal at the bottom of said landfill;

covering said layer of compacted coal with a layer of granular coal;

covering said layer of granular coal with a layer of lye;

transporting waste to a processing location near said landfill;

grinding said waste and mixing said waste with a fluid to form a slurry; and transporting said slurry to said landfill.

2. The process of claim 1 further comprising the step of using pump means to recover leachate from between said compacted and said granular coal layers.

3. The process of claim 2 further comprising recovering emanating gas off of the top of said slurry deposited in said landfill.

4. The process of claim 2 wherein said step of transporting said slurry to said landfill comprises an auger device.

5. The process of claim 4 further comprising the prior steps of first:

collecting waste;

pre-processing said collected waste for transportation to said landfill site; and transporting said pre-processed collected waste to said landfill site by rail means.

6. The process of claim 5 wherein said pre-processing step comprises compaction.

7. The process of claim 5 wherein said pre-processing step comprises processing said collected waste through a grinder device having a plurality of rotating cylinders presenting teeth thereon for crushing and tearing said waste.

8. The process of claim 7 further comprising recovering emanating gas off of the top of said waste deposited in said landfill.

9. The process of claim 8 further comprising returning said recovered leachate to said grinder device.

10. A waste receipt and processing landfill site for the receipt and processing of waste comprising:

a pit defined in the land;

a clay liner positioned at the bottom of said pit;

a compacted coal layer positioned at the bottom of said pit and on top of said clay liner;

a granular coal layer positioned on top of said compacted coal layer; and a layer of lye positioned on top of said granular coal layer, wherein the waste is deposited on top of said lye layer.

11. The landfill site of claim 10 further comprising a grinder device having a plurality of rotating cylinders presenting teeth thereon for crushing and tearing the waste prior to deposition in the landfill, said grinder device being positioned proximate said landfill site.

12. The landfill site of claim 11 further comprising an auger device for transporting the waste from said grinder device to said landfill site.

13. The landfill site of claim 12 further comprising means for recovering leachate from between said compacted and said granular coal layers.

14. The landfill site of claim 13 further comprising means for recovering emanating gas from the waste deposited in said landfill.

* * * * *